(12) United States Patent
Zheng et al.

(10) Patent No.: US 10,770,723 B2
(45) Date of Patent: Sep. 8, 2020

(54) POSITIVE ELECTRODE MATERIAL AND LITHIUM ION BATTERY

(71) Applicant: Ningde Amperex Technology Limited, Ningde, Fujian (CN)

(72) Inventors: Chunfeng Zheng, Fujian (CN); Leimin Xu, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 140 days.

(21) Appl. No.: 16/134,914

(22) Filed: Sep. 18, 2018

(65) Prior Publication Data
US 2019/0088938 A1 Mar. 21, 2019

(30) Foreign Application Priority Data
Sep. 19, 2017 (CN) .......................... 2017 1 0851376

(51) Int. Cl.
| | | |
|---|---|---|
| *H01M 4/36* | (2006.01) | |
| *H01M 10/0525* | (2010.01) | |
| *H01M 4/505* | (2010.01) | |
| *H01M 4/62* | (2006.01) | |
| *H01M 4/525* | (2010.01) | |
| *H01M 4/131* | (2010.01) | |
| *H01M 4/02* | (2006.01) | |

(52) U.S. Cl.
CPC ............ *H01M 4/366* (2013.01); *H01M 4/131* (2013.01); *H01M 4/505* (2013.01); *H01M 4/525* (2013.01); *H01M 4/624* (2013.01); *H01M 10/0525* (2013.01); *H01M 2004/028* (2013.01)

(58) Field of Classification Search
CPC ............ H01M 4/366; H01M 10/0525; H01M 2004/028; H01M 4/131; H01M 4/624
See application file for complete search history.

(56) References Cited

U.S. PATENT DOCUMENTS

2012/0141919 A1* 6/2012 Lee .................... H01M 4/8663
429/524

FOREIGN PATENT DOCUMENTS

| CN | 101777647 A | 7/2010 |
|---|---|---|
| CN | 105226271 A | 1/2016 |

OTHER PUBLICATIONS

Artur Tron et al., Surface Modification of LiCoO2 by NASICON-Type Ceramic Materials for Lithium Ion Batteries, Journal of Nanoscience and Nanotechnology, 2017, pp. 4977-4982, vol. 17, No. 7.
Lilong Fang et al., ZrO2—CeO2 and Al2 O3—ZrO2 (CeO2) systems, Engineering Drawing, Aug. 31, 1995, pp. 122-123, Chemical Industry Press.

\* cited by examiner

*Primary Examiner* — Cynthia H Kelly
*Assistant Examiner* — Monique M Wills

(57) ABSTRACT

The examples of the present application provide a positive electrode material and a lithium ion battery. The positive electrode material comprises: a substrate material; and a coating material formed on at least one portion of the surface of the substrate material; the general formula of the substrate material being $Li_{1+x}Co_{1-y}M_yO_2$ or $LiNi_aCo_bN_{1-a-b}O_2$, wherein $0 \le x < 0.1$, $0 \le y < 0.1$ and M is at least one of selected from the group of Mn, Ni, Al, Mg, Ti, Zr, Y, P, Cr; $\frac{1}{3} \le a \le 0.82$, $0.1 \le b \le \frac{1}{3}$, $0.6 \le a+b$, N is at least one of selected from the group of Mn, Al, Mg, Ti, Zr, La, Ce, Y; the coating material includes $CeZrO_{4-z}$, wherein $0 \le z < 0.1$. By using a positive electrode material coated with $CeZrO_{4-z}$, the direct current (DC) resistance of the lithium ion battery is greatly reduced.

17 Claims, 1 Drawing Sheet

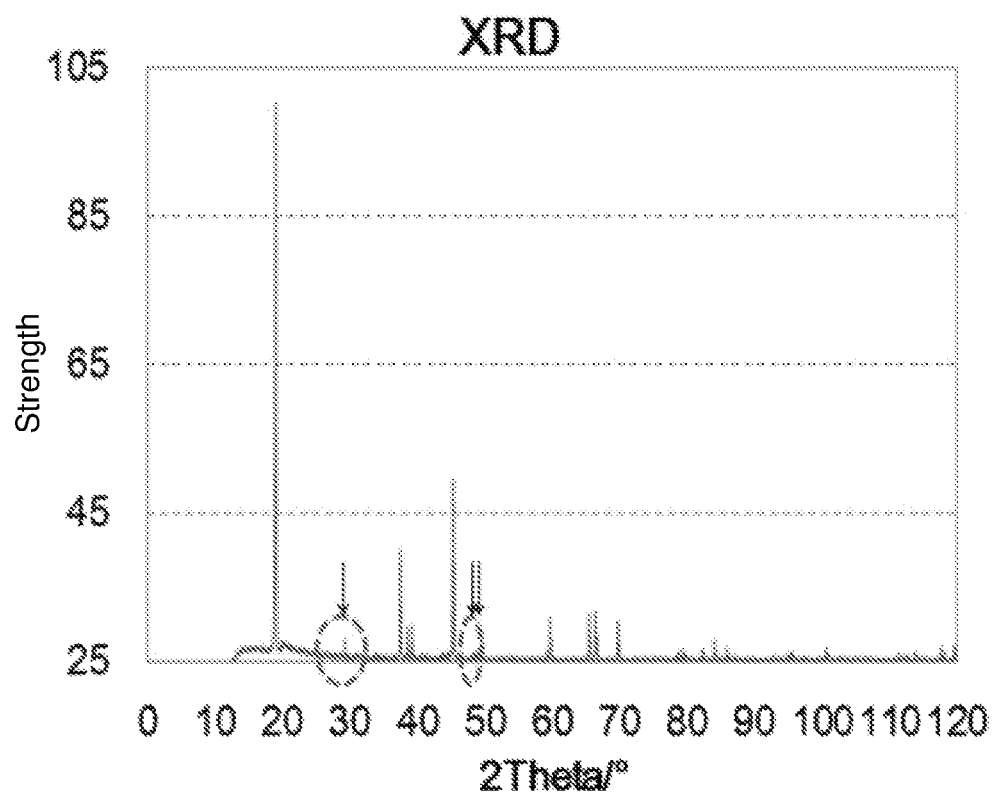

POSITIVE ELECTRODE MATERIAL AND LITHIUM ION BATTERY

CROSS-REFERENCE TO RELATED APPLICATION

This application claims priority to and benefits of Chinese Patent Application Serial No. 201710851376.7, filed with the State Intellectual Property Office of P. R. China on Sep. 19, 2017, the entire content of which is incorporated herein by reference.

FIELD OF THE APPLICATION

The embodiments of the present application relate to the field of battery, in particular, to a positive electrode material and a lithium ion battery.

BACKGROUND OF THE APPLICATION

With the popularization of portable products such as mobile phones and notebook computers, the demand for lithium ion batteries is increasing. Lithium ion battery positive electrode material is the core material of lithium ion battery. Its performance and quality directly affect the important performances of lithium ion battery such as capacity, life, safety and DC resistance (DCR). The DCR of lithiumion battery has been the focus of attention in recent years. When the DCR of lithiumion battery is too large, even if the battery capacity is high, the voltage will drop rapidly and the mobile phone will automatically shut down. Therefore, reducing DCR of an electrode assembly is of great significance for lithium ion batteries.

Currently, the main means of reducing DCR is to reduce the particle size of lithium cobaltate (LCO) or to coat LCO with conventional $Al_2O_3$, $TiO_2$, MgO and $ZrO_2$. The DCR can be improved by reducing the particle size, increasing the specific surface area (BET), etc., but the particle size being too small and the BET being too large leads the compact density to be too low, resulting in a low volumetric energy density of the entire electrode assembly and impaired high-temperature storage performance. For coating with conventional $Al_2O_3$, $TiO_2$, MgO, and $ZrO_2$, although these coating methods can improve the lithium ion diffusion coefficient, the electron conductance is lowered due to the formed oxide coating layer being non-conductive, thus the improvement effect on DCR is limited.

In the prior art disclosed, coating a lithium cobaltate with a fast ion conductor may increase the lithium ion diffusion coefficient, thereby reducing DCR to some extent, but the electron conductance after coating will be reduced and the improvement effect will be not obvious.

SUMMARY OF THE APPLICATION

In order to overcome the above problems existing in the prior art, some embodiments of the present application provide a positive electrode material comprising: a substrate material; and a coating material formed on at least one portion of a surface of the substrate material; the general formula of the substrate material being $Li_{1+x}Co_{1-y}M_yO_2$ or $LiNi_aCo_bN_{1-a-b}O_2$, wherein $0 \leq x < 0.1$, $0 \leq y < 0.1$ and M is at least one of selected from the group of Mn, Ni, Al, Mg, Ti, Zr, Y, P and Cr; $1/3 \leq a \leq 0.82$, $0.1 \leq b \leq 1/3$, $0.6 \leq a+b$, N is selected from at least one of Mn, Al, Mg, Ti, Zr, La, Ce and Y; the coating material includes $CeZrO_{4-z}$, wherein $0 \leq z < 0.1$.

In some examples of present application, the coating material accounts for 0.04% to 1% of the total mass of the positive electrode material.

In some examples of present application, the coating material accounts for 0.1% of the total mass of the positive electrode material.

In some examples of present application, the particle size corresponding to 50% of the volume distribution of the positive electrode material is 4 to 25 μm.

In some examples of present application, the particle size corresponding to 50% of the volume distribution of the positive electrode material is 15 μm.

In some examples of present application, $0 < y < 0.1$.

In some examples of present application, a coating layer formed of the coating material has a tetragonal phase structure, and the Ce atoms are in a gradient distribution. In some examples of present application, both x and y are 0, the coating material accounts for 0.1% of the total mass of the positive electrode material, and the particle size corresponding to 50% of the volume distribution of the positive electrode material is 15 μm.

Further embodiments of the present application provide a positive electrode comprising: a positive current collector; and a positive active material arranged on the positive current collector; the positive active material includes the above positive electrode material.

Further embodiments of the present application also provide a lithium ion battery including the above positive electrode.

The embodiments of the present application use nano-$CeZrO_{4-z}$ with high structural stability and thermal stability as a coating material. The coating layer formed of the coating material containing $CeZrO_{4-z}$ has a tetragonal phase structure, and the Ce atoms are in a gradient distribution. $CeZrO_{4-z}$ has non-stoichiometric characteristics and can act as a reservoir for oxygen, which makes oxygen atoms with high migration, so the positive electrode material has a high electron and ionic conductivity.

Further, Ce can form a stable surface structure of the positive electrode material, and Zr can suppress the C-axis variation in the delithiation process, so that the resulting positive electrode material structure is stable. The larger the C axis, the larger the Li+ diffusion channel, and the faster the Li+ ion diffuses, the larger the ion conductance.

Compared to the positive electrode material without the coating material $CeZrO_{4-z}$, the embodiments of the present application significantly lower the DCR of the lithium ion battery by using the positive electrode material coated with $CeZrO_{4-z}$.

BRIEF DESCRIPTION OF THE ACCOMPANYING DRAWINGS

The FIGURE shows a XRD spectrum of a positive electrode material of the lithium cobaltate coated with $CeZrO_{4-z}$ in Example 1.

DETAILED DESCRIPTION OF THE PREFERRED EXAMPLES

The following examples are provided to enable those skilled in the art to understand the present application more fully, but do not limit the application in any way.

The present application forms a $CeZrO_{4-z}$ coating layer on the surface of the substrate material of lithium cobaltate by a sol-gel method, wherein $0 \leq z < 0.1$; $CeZrO_{4-z}$ has non-stoichiometric characteristics and can act as a reservoir for oxygen, which makes oxygen atoms with high migration, so the positive electrode material has a high electron and ionic conductivity.

Embodiments of the present application provide a coated structure positive electrode material for a lithium ion battery, the substrate material is a lithium cobaltate or a lithium nickel cobalt manganese oxide or a lithium nickel cobalt aluminate oxide and the general formula of the lithium cobaltate being $Li_{1+x}Co_{1-y}M_yO_2$, wherein $0 \leq x < 0.1$, $0 \leq y < 0.1$, the element M is at least one of selected from the group of Mn, Ni, Al, Mg, Ti, Zr, Y, P and Cr. In some examples of present application, lithium cobaltate being $Li_{1+x}Co_{1-y}M_yO_2$, $0 \leq x < 0.1$ and $0 < y < 0.1$. The general form of lithium cobaltate or lithium nickel cobalt manganese oxide or lithium nickel cobalt aluminate oxide being $LiNi_aCo_bN_{1-a-b}O_2$, wherein $1/3 \leq a \leq 0.82$, $0.1 \leq b \leq 1/3$, $0.6 \leq a+b$, and the element N is at least one of selected from the group of Mn, Al, Mg, Ti, Zr, La, Ce and Y. The coating material includes $CeZrO_{4-z}$, wherein $0 \leq z < 0.1$. $CeZrO_{4-z}$ is highly structurally stable and thermally stable.

In the coating material, Ce can form a stable surface structure of the positive electrode material, Zr can suppress the C-axis variation in the delithiation process, so that the resulting positive electrode material structure is stable. The precursors of Ce include, but are not limited to, cerium nitrate, cerium chloride, and cerium sulfate. The precursors of Zr include, but are not limited to, zirconium nitrate, tetrabutylzirconate, tetraisopropylzirconate, and zirconium tetrachloride.

According to some embodiments, the coating material accounts for 0.04% to 1% (including endpoint values) of the total mass of the positive electrode material The surface coating layer formed of the coating material has a tetragonal phase structure, and the Ce elements are in a gradient distribution. The gradient distribution of the Ce element is caused by a higher sintering temperature. The SEM/TEM-mapping method can be used to determine the distribution of the Ce element. Specifically, plasma cutting (CP) is first performed on the particles to cut the particles, followed by field emission scanning electron microscopy (for example, ZEISS SEM-Sigma-O2-3+OXFORD EDS-Xmax 20 mm²) to perform Mapping and a line sweep is performed from the edge of the particle to the inside of the particle, to obtain the content distribution of Ce. The gradient distribution of the Ce element may be a linear gradient or a non-linear gradient. For example, the concentration of the Ce element may be linearly decreased from the surface to the inside. For example, the concentration of the Ce element may be increased first and then decreased, or decreased first and then increased and then decreased, from the surface to the inside.

The higher the content of $CeZrO_{4-z}$, the more the improvement of the electronic conductance of lithium cobaltate. However, when the content is too large (>1%), the proportion of active materials capable of reversible deintercalation decreases correspondingly, resulting in a decrease in the initial discharge capacity. And when the content of the coating material is 0.1%, the battery performance is the best, and the DCR is significantly reduced, because when the content of the coating material is 0.1%, the content of reversible deintercalated active material is relatively high while improving the electronic conductance of lithium cobaltate, thereby ensuring a high initial discharge capacity of the battery while the DCR is effectively reduced.

According to some embodiments, the particle size (Dv50) corresponding to 50% of the volume distribution of the positive electrode material coated with the coating material is 4 to 25 μm. The smaller the particle size, the smaller the lithium ion diffusion path, the faster the lithium ion diffuses, and the smaller the DCR. However, due to limited technology, it is currently difficult to produce a positive electrode material having a Dv50 of less than 4 μm.

The preparation of the positive electrode material will be described below.

A soluble cerium-containing compound and a zirconium-containing compound are dissolved in a solvent, and then mixed to form a mixed solution; the value of pH of the mixed solution is adjusted by ammonia from 7 to 10 to form a sol-gel coating material solution, and then a lithium cobaltate material is added to the sol-gel coating material solution, and stirred for 0.15 to 4 hours; then, drying is performed by suction filtration or directly, and then calcination is performed in air or oxygen atmosphere at 700-1000° C. for 1-10 h for crushing and sieving (using the method commonly used in the art) to form a positive electrode material coated with $CeZrO_{4-z}$, the positive electrode material having a Dv50 of between 4 and 25 μm; wherein the cerium-containing compound includes, but is not limited to, one or more of cerium nitrate, cerium chloride, and ceriumsulfate, and the zirconium-containing compound includes, but is not limited to, one or more of zirconium nitrate, tetrabutylzirconate, tetraisopropylzirconate, and zirconium tetrachloride; the solvents includes, but are not limited to, water, ethanol, isopropanol or combination thereof.

Embodiments of the present application further provide a positive electrode comprising a positive current collector and a positive active material arranged on the positive current collector; the positive active material includes the above positive electrode material. The positive current collector may include, for example, a copper foil and an aluminum foil, however, other positive current collectors commonly used in the art may be employed.

Embodiments of the present application also provide a lithium ion battery including the above positive electrode.

Embodiments of the present application also provide a lithium ion battery comprising a positive electrode, a negative electrode, a separator, an electrolyte, and the like. Among them, the positive electrode material is the coated structure positive electrode material described above.

A lithium ion battery may be prepared by using a method commonly used in the art and using the coated structure positive electrode material described above as a positive electrode material, wherein the negative electrode material of the lithium ion battery may be a graphite material, the separator may be made of a polypropylene (PP) or a polyethylene (PE), and a $LiPF_6$ may be used as the lithium salt. Those skilled in the art will appreciate that other negative electrodes, separators, and electrolytes commonly used in the art may be employed. The positive electrode material, the separator, the negative electrode material, and the like are sequentially wound or stacked into a electrode assembly, and then packaged, for example, in an aluminum plastic film for encapsulation, and injected with an electrolyte for packaging, and testing.

Those skilled in the art will appreciate that the above described methods for preparing the lithium ion battery are merely examples. Other methods commonly used in the art may be employed without departing from the disclosure of the present application.

Some specific examples and comparative examples are listed below to better illustrate the application.

EXAMPLE 1

A cerium nitrate of 5.5 g and a zirconium nitrate of 5.7 g are dissolved in water (fully dissolved), mixed to form a mixed solution, an ammonia water is dripped to adjust the pH of the mixed solution to 10 and fully stirred for 10 minutes, then LiCoO$_2$ of 5000 g is added for stirring for another 1 h followed by suction filtration, drying, and calcination at 900° C. under the air atmosphere for 4 h; then the sintered sample is crushed and sieved to obtain a positive electrode material coated with CeZrO$_{4-z}$ having a Dv50 of about 4 μm. The obtained coated structure positive electrode material is subjected to a lithium ionbattery preparation and tested for DCR.

EXAMPLE 2

The method here is consistent with the preparation method of Example 1, except that the positive electrode material coated with CeZrO$_{4-z}$ obtained by Example 2 is one having a Dv50 of about 10 μm.

EXAMPLE 3

The method here is consistent with the preparation method of Example 1, except that the positive electrode material coated with CeZrO$_{4-z}$ obtained by Example 3 is one having a Dv50 of about 15 μm.

EXAMPLE 4

The method here is consistent with the preparation method of Example 1, except that the positive electrode material coated with CeZrO$_{4-z}$ obtained by Example 4 is one having a Dv50 of about 20 μm.

EXAMPLE 5

The method here is consistent with the preparation method of Example 1, except that the positive electrode material coated with CeZrO$_{4-z}$ obtained by Example 5 is one having a Dv50 of about 25 μm.

EXAMPLE 6

The method here is consistent with the preparation method of Example 1, except that the substrate material used in Example 6 is LiCo$_{0.92}$Mg$_{0.03}$Al$_{0.02}$Ti$_{0.03}$O$_2$ and the positive electrode material coated with CeZrO$_{4-z}$ obtained is one having a Dv50 of about 15 μm.

EXAMPLE 7

The method here is consistent with the preparation method of Example 1, except that the substrate material used in Example 7 is LiCo$_{0.93}$Mg$_{0.04}$Al$_{0.03}$O$_2$ and the positive electrode material coated with CeZrO$_{4-z}$ obtained is one having a Dv50 of about 15 μm.

EXAMPLE 8

The method here is consistent with the preparation method of Example 1, except that the substrate material used in Example 8 is LiCo$_{0.93}$Mg$_{0.04}$Ti$_{0.03}$O$_2$ and the positive electrode material coated with CeZrO$_{4-z}$ obtained is one having a Dv50 of about 15 μm.

EXAMPLE 9

The method here is consistent with the preparation method of Example 1, except that the substrate material used in Example 9 is LiCo$_{0.92}$Mg$_{0.03}$Al$_{0.02}$Y$_{0.03}$O$_2$ and the positive electrode material coated with CeZrO$_{4-z}$ obtained is one having a Dv50 of about 15 μm.

EXAMPLE 10

The method here is consistent with the preparation method of Example 1, except that the substrate material used in Example 10 is LiCo$_{0.95}$Mg$_{0.05}$O$_2$ and the positive electrode material coated with CeZrO$_{4-z}$ obtained is one having a Dv50 of about 15 μm.

EXAMPLE 11

A cerium nitrate of 2.2 g and a zirconium nitrate of 2.3 g are dissolved in water, mixed to form a mixed solution, an ammonia water is dripped to adjust the pH of the mixed solution to 8 and fully stirred for 10 minutes, then LiCoO$_2$ of 5000 g is added for stirring for another 0.15 h followed by suction filtration, drying, and calcination at 1000° C. under the oxygen atmosphere for 1 h; then the sintered sample is crushed and sieved to obtain a positive electrode material coated with CeZrO$_{4-z}$ having a Dv50 of about 15 μm. The obtained coated structure positive electrode material is subjected to a lithium ion battery preparation and tested for DCR.

EXAMPLE 12

A barium chloride of 20 g is dissolved in ethanol and a zirconium tetrachloride of 19 g are dissolved in isopropanol, mixed to form a mixed solution, an ammonia water is dripped to adjust the pH of the mixed solution to 7 and fully stirred for 20 minutes, then LiCoO$_2$ of 5000 g is added for stirring for another 2 h followed by suction filtration, drying, and calcination at 700° C. under the oxygen atmosphere for 10 h; then the sintered sample is crushed and sieved to obtain a positive electrode material coated with CeZrO$_{4-z}$ having a Dv50 of about 15 μm. The obtained coated structure positive electrode material is subjected to a lithium ionbattery preparation and tested for DCR.

EXAMPLE 13

A cerium nitrate of 27.5 g and a cerium sulfate of 47.8 g are dissolved in isopropanol, and a zirconium nitrate of 28.5 g and a tetrabutylzirconate of 32 g are dissolved in isopropanol, mixed to form a mixed solution, an ammonia water is dripped to adjust the pH of the mixed solution to 9 and fully stirred for 30 minutes, then LiCoO$_2$ of 5000 g is added for stirring for another 4 h followed by suction filtration, drying, and calcination at 800° C. under the oxygen atmosphere for 5 h; then the sintered sample is crushed and sieved to obtain a positive electrode material coated with CeZrO$_{4-z}$ having a Dv50 of about 15 μm. The obtained coated structure positive electrode material is subjected to a lithium ion battery preparation and tested for DCR.

EXAMPLE 14

The method here is consistent with the preparation method of Example 1, except that the substrate material used in Example 14 is a commercially available NCM333, and the obtained positive electrode material has a Dv50 of 7 μm.

EXAMPLE 15

The method here is consistent with the preparation method of Example 1, except that the substrate material used in Example 15 is a commercially available NCM523, and the obtained positive electrode material has a Dv50 of 7 μm.

EXAMPLE 16

The method here is consistent with the preparation method of Example 1, except that the substrate material used in Example 16 is a commercially available NCM622, and the obtained positive electrode material has a Dv50 of 7 μm.

EXAMPLE 17

The method here is consistent with the preparation method of Example 1, except that the substrate material used in Example 17 is a commercially available NCM811, and the obtained positive electrode material has a Dv50 of 7 μm.

EXAMPLE 18

The method here is consistent with the preparation method of Example 1, except that the substrate material used in Example 18 is a commercially available $LiNi_{0.82}Co_{0.15}Al_{0.03}O_2$, and the obtained positive electrode material has a Dv50 of 7 μm.

EXAMPLE 19

The method here is consistent with the preparation method of Example 1, except that the substrate material used in Example 19 is a commercially available $LiNi_{0.5}Co_{0.2}Mn_{0.299}Ti_{0.001}O_2$, and the obtained positive electrode material has a Dv50 of 7 μm.

EXAMPLE 20

The method here is consistent with the preparation method of Example 1, except that the substrate material used in Example 20 is a commercially available $LiNi_{0.5}Co_{0.2}Mn_{0.298}Ti_{0.002}O_2$, and the obtained positive electrode material has a Dv50 of 7 μm.

EXAMPLE 21

The method here is consistent with the preparation method of Example 1, except that the substrate material used in Example 21 is a commercially available $LiNi_{0.5}Co_{0.2}Mn_{0.295}Ti_{0.005}O_2$, and the obtained positive electrode material has a Dv50 of 7 μm.

EXAMPLE 22

The method here is consistent with the preparation method of Example 1, except that the substrate material used in Example 22 is a commercially available $LiNi_{0.5}Co_{0.2}Mn_{0.29}Ti_{0.01}O_2$, and the obtained positive electrode material has a Dv50 of 7 μm.

EXAMPLE 23

The method here is consistent with the preparation method of Example 1, except that the substrate material used in Example 23 is a commercially available $LiNi_{0.5}Co_{0.2}Mn_{0.299}Mg_{0.001}O_2$, and the obtained positive electrode material has a Dv50 of 7 μm.

EXAMPLE 24

The method here is consistent with the preparation method of Example 1, except that the substrate material used in Example 24 is a commercially available $LiNi_{0.5}Co_{0.2}Mn_{0.299}Zr_{0.001}O_2$, and the obtained positive electrode material has a Dv50 of 7 μm.

EXAMPLE 25

The method here is consistent with the preparation method of Example 1, except that the substrate material used in Example 25 is a commercially available $LiNi_{0.5}Co_{0.2}Mn_{0.299}Y_{0.001}O_2$, and the obtained positive electrode material has a Dv50 of 7 μm.

EXAMPLE 26

The method here is consistent with the preparation method of Example 1, except that the substrate material used in Example 26 is a commercially available $LiNi_{0.5}Co_{0.2}Mn_{0.298}Ti_{0.001}Mg_{0.001}O_2$, and the obtained positive electrode material has a Dv50 of 7 μm.

EXAMPLE 27

The method here is consistent with the preparation method of Example 1, except that the substrate material used in Example 27 is a commercially available $LiNi_{0.82}Co_{0.15}Al_{0.029}Y_{0.001}O_2$, and the obtained positive electrode material has a Dv50 of 7 μm.

COMPARATIVE EXAMPLE 1

The method here is consistent with the preparation method of Example 1, except that the substrate material of the Comparative Example 1 is not coated with $CeZrO_{4-z}$.

COMPARATIVE EXAMPLE 2

The method here is consistent with the preparation method of Example 2, except that the substrate material of the Comparative Example 2 is not coated with $CeZrO_{4-z}$.

COMPARATIVE EXAMPLE 3

The method here is consistent with the preparation method of Example 3, except that the substrate material of the Comparative Example 3 is not coated with $CeZrO_{4-z}$.

COMPARATIVE EXAMPLE 4

The method here is consistent with the preparation method of Example 4, except that the substrate material of the Comparative Example 4 is not coated with $CeZrO_{4-z}$.

COMPARATIVE EXAMPLE 5

The method here is consistent with the preparation method of Example 5, except that the substrate material of the Comparative Example 5 is not coated with $CeZrO_{4-z}$.

COMPARATIVE EXAMPLE 6

The method here is consistent with the preparation method of Example 6, except that the substrate material of the Comparative Example 6 is not coated with $CeZrO_{4-z}$.

COMPARATIVE EXAMPLE 7

The method here is consistent with the preparation method of Example 7, except that the substrate material of the Comparative Example 7 is not coated with $CeZrO_{4-z}$.

COMPARATIVE EXAMPLE 8

The method here is consistent with the preparation method of Example 8, except that the substrate material of the Comparative Example 8 is not coated with $CeZrO_{4-z}$.

COMPARATIVE EXAMPLE 9

The method here is consistent with the preparation method of Example 9, except that the substrate material of the Comparative Example 9 is not coated with $CeZrO_{4-z}$.

COMPARATIVE EXAMPLE 10

The method here is consistent with the preparation method of Example 10, except that the substrate material of the Comparative Example 10 is not coated with $CeZrO_{4-z}$.

COMPARATIVE EXAMPLE 11

The method here is consistent with the preparation method of Example 14, except that the substrate material of the Comparative Example 11 is not coated with $CeZrO_{4-z}$.

COMPARATIVE EXAMPLE 12

The method here is consistent with the preparation method of Example 15, except that the substrate material of the Comparative Example 12 is not coated with $CeZrO_{4-z}$.

COMPARATIVE EXAMPLE 13

The method here is consistent with the preparation method of Example 16, except that the substrate material of the Comparative Example 13 is not coated with $CeZrO_{4-z}$.

COMPARATIVE EXAMPLE 14

The method here is consistent with the preparation method of Example 17, except that the substrate material of the Comparative Example 14 is not coated with $CeZrO_{4-z}$.

COMPARATIVE EXAMPLE 15

The method here is consistent with the preparation method of Example 18, except that the substrate material of the Comparative Example 15 is not coated with $CeZrO_{4-z}$.

COMPARATIVE EXAMPLE 16

The method here is consistent with the preparation method of Example 19, except that the substrate material of the Comparative Example 16 is not coated with $CeZrO_{4-z}$.

COMPARATIVE EXAMPLE 17

The method here is consistent with the preparation method of Example 20, except that the substrate material of the Comparative Example 17 is not coated with $CeZrO_{4-z}$.

COMPARATIVE EXAMPLE 18

The method here is consistent with the preparation method of Example 21, except that the substrate material of the Comparative Example 18 is not coated with $CeZrO_{4-z}$.

COMPARATIVE EXAMPLE 19

The method here is consistent with the preparation method of Example 22, except that the substrate material of the Comparative Example 19 is not coated with $CeZrO_{4-z}$.

COMPARATIVE EXAMPLE 20

The method here is consistent with the preparation method of Example 23, except that the substrate material of the Comparative Example 20 is not coated with $CeZrO_{4-z}$.

COMPARATIVE EXAMPLE 21

The method here is consistent with the preparation method of Example 24, except that the substrate material of the Comparative Example 21 is not coated with $CeZrO_{4-z}$.

COMPARATIVE EXAMPLE 22

The method here is consistent with the preparation method of Example 25, except that the substrate material of the Comparative Example 22 is not coated with $CeZrO_{4-z}$.

COMPARATIVE EXAMPLE 23

The method here is consistent with the preparation method of Example 26, except that the substrate material of the Comparative Example 23 is not coated with $CeZrO_{4-z}$.

COMPARATIVE EXAMPLE 24

The method here is consistent with the preparation method of Example 27, except that the substrate material of the Comparative Example 24 is not coated with $CeZrO_{4-z}$.

DCR test process:
1) laying in a cryogenic box at 25° C. for 4 h
2) charging to 4.35V with 0.7 C constant current (i.e., the current value of theoretical capacity is completely discharged within 2 h), charging to 0.025 C with 4.35V constant voltage, at rest for 10 min
3) discharging to 3.4V with 0.1 C, at rest for 5 min (obtaining the actual capacity in this step) testing for DCR at 25° C.
4) at rest for 5 min, charging to 4.35 v with 0.7 constant current, charging to 0.025 C with 4.35V constant voltage (calculated with the actual capacity obtained in step 3)
5) at rest for 10 min
6) discharging for 3 h with 0.1 C (calculated with the actual capacity obtained in step 3) to obtain 70% SOC (remaining battery capacity) DCR
7) discharging for 1 s with 1 C (picking up at 5 ms, capacity is calculated by the labeled capacity of the corresponding battery component)
8) discharging for 5 h with 0.1 C (calculated with the actual capacity obtained in step 5) to obtain 20% SOC DCR
9) discharging for 1 s with 1 C (picking up at 5 ms, capacity is calculated by the labeled capacity of the corresponding battery component)
10) discharging for 1 h with 0.1 C (calculated with the actual capacity obtained in step 3) to obtain 10% SOC DCR 11) discharging for 1 s with 1 C (picking up at 5 ms, capacity is calculated by the labeled capacity of the corresponding battery component)

12) discharging to 3.4V with 0.1 C (calculated with the actual capacity obtained in step 3)

13) at rest for 5 min

The measurement results of the respective examples and comparative examples are shown in Table 1 below. For convenience of comparison, the results of Table 1 are shown in groups.

TABLE 1

| | Substrate material | Coating amount of $CeZrO_{4-z}$ (wt. %) | Particle size Dv50 of positive electrode material (μm) | 25° C. DCR (mohm) 70% SOC | 20% SOC | 10% SOC | Initial discharging capacity (mAh/g) |
|---|---|---|---|---|---|---|---|
| Examples | | | | | | | |
| 1 | $LiCoO_2$ | 0.1 | 4 | 48.3 | 52.3 | 54.0 | 167.5 |
| 2 | $LiCoO_2$ | 0.1 | 10 | 53.7 | 60.9 | 66.5 | 166.7 |
| 3 | $LiCoO_2$ | 0.1 | 15 | 58.2 | 67.0 | 72.7 | 166.3 |
| 4 | $LiCoO_2$ | 0.1 | 20 | 61.2 | 75.3 | 84.5 | 166.0 |
| 5 | $LiCoO_2$ | 0.1 | 25 | 65.7 | 80.3 | 96.0 | 165.4 |
| 3 | $LiCoO_2$ | 0.1 | 15 | 58.2 | 67.0 | 72.7 | 166.3 |
| 6 | $LiCo_{0.92}Mg_{0.03}Al_{0.02}Ti_{0.03}O_2$ | 0.1 | 15 | 52.0 | 60.3 | 62.6 | 166.6 |
| 7 | $LiCo_{0.93}Mg_{0.04}Al_{0.03}O_2$ | 0.1 | 15 | 54.6 | 61.5 | 69.0 | 166.8 |
| 8 | $LiCo_{0.93}Mg_{0.04}Ti_{0.03}O_2$ | 0.1 | 15 | 48.7 | 55.7 | 60.5 | 166.7 |
| 9 | $LiCo_{0.92}Mg_{0.03}Al_{0.02}Y_{0.03}O_2$ | 0.1 | 15 | 55.7 | 63.1 | 71.1 | 166.0 |
| 10 | $LiCo_{0.95}Mg_{0.05}O_2$ | 0.1 | 15 | 49.8 | 57.3 | 61.7 | 166.5 |
| 11 | $LiCoO_2$ | 0.04 | 15 | 59.6 | 68.7 | 73.9 | 166.6 |
| 3 | $LiCoO_2$ | 0.1 | 15 | 58.2 | 67.0 | 72.7 | 166.3 |
| 12 | $LiCoO_2$ | 0.50 | 15 | 58.9 | 67.6 | 71.6 | 166.8 |
| 13 | $LiCoO_2$ | 1.00 | 15 | 61.1 | 71.3 | 77.2 | 164.2 |
| 14 | $LiNi_{1/3}Co_{1/3}Mn_{1/3}O_2$ | 0.1 | 7 | 44.6 | 48.6 | 50.3 | 165.3 |
| 15 | $LiNi_{0.5}Co_{0.02}Mn_{0.3}O_2$ | 0.1 | 7 | 46 | 50 | 51.7 | 173.6 |
| 16 | $LiNi_{0.6}Co_{0.2}Mn_{0.2}O_2$ | 0.1 | 7 | 47.9 | 51.9 | 53.6 | 176.4 |
| 17 | $LiNi_{0.8}Co_{0.1}Mn_{0.1}O_2$ | 0.1 | 7 | 49.2 | 53.2 | 54.9 | 190.2 |
| 18 | $LiNi_{0.82}Co_{0.15}Al_{0.03}O_2$ | 0.1 | 7 | 49.8 | 55.3 | 56.8 | 180 |
| 19 | $LiNi_{0.5}Co_{0.2}Mn_{0.299}Ti_{0.001}O_2$ | 0.1 | 7 | 46.9 | 49.5 | 50.3 | 174.6 |
| 20 | $LiNi_{0.5}Co_{0.2}Mn_{0.298}Ti_{0.002}O_2$ | 0.1 | 7 | 44.1 | 48.7 | 49.6 | 174.8 |
| 21 | $LiNi_{0.5}Co_{0.2}Mn_{0.295}Ti_{0.005}O_2$ | 0.1 | 7 | 42.9 | 47.5 | 48.4 | 173.6 |
| 22 | $LiNi_{0.5}Co_{0.2}Mn_{0.29}Ti_{0.01}O_2$ | 0.1 | 7 | 42.1 | 45.5 | 46.2 | 171.8 |
| 23 | $LiNi_{0.5}Co_{0.2}Mn_{0.299}Mg_{0.001}O_2$ | 0.1 | 7 | 45.3 | 48.9 | 50.5 | 174.6 |
| 24 | $LiNi_{0.5}Co_{0.2}Mn_{0.299}Zr_{0.001}O_2$ | 0.1 | 7 | 44.3 | 48.5 | 49.7 | 174.3 |
| 25 | $LiNi_{0.5}Co_{0.2}Mn_{0.299}Y_{0.001}O_2$ | 0.1 | 7 | 44.7 | 48.9 | 50.1 | 174.7 |
| 26 | $LiNi_{0.5}Co_{0.2}Mn_{0.298}Ti_{0.001}Mg_{0.001}O_2$ | 0.1 | 7 | 43.5 | 47.7 | 48.9 | 175.2 |
| 27 | $LiNi_{0.82}Co_{0.15}Al_{0.029}Y_{0.001}O_2$ | 0.1 | 7 | 47.5 | 53.6 | 54.3 | 180.7 |
| Comparative Examples | | | | | | | |
| 1 | $LiCoO_2$ | / | 4 | 59.5 | 65.4 | 66.9 | 167.2 |
| 2 | $LiCoO_2$ | / | 10 | 64.9 | 74.0 | 79.4 | 166.0 |
| 3 | $LiCoO_2$ | / | 15 | 64.1 | 73.8 | 78.8 | 166.0 |
| 4 | $LiCoO_2$ | / | 20 | 72.4 | 88.4 | 97.4 | 165.8 |
| 5 | $LiCoO_2$ | / | 25 | 71.8 | 86.7 | 102.3 | 165.3 |
| 6 | $LiCo_{0.92}Mg_{0.03}Al_{0.02}Ti_{0.03}O_2$ | / | 15 | 53.6 | 62.7 | 65.3 | 166.3 |
| 7 | $LiCo_{0.93}Mg_{0.04}Al_{0.03}O_2$ | / | 15 | 59.9 | 68.2 | 76.2 | 166.4 |
| 8 | $LiCo_{0.93}Mg_{0.04}Ti_{0.03}O_2$ | / | 15 | 54.0 | 62.4 | 67.7 | 166.1 |
| 9 | $LiCo_{0.92}Mg_{0.03}Al_{0.02}Y_{0.03}O_2$ | / | 15 | 61.0 | 69.8 | 78.3 | 165.7 |
| 10 | $LiCo_{0.95}Mg_{0.05}O_2$ | / | 15 | 55.1 | 64.0 | 68.9 | 166.0 |
| 11 | $LiNi_{1/3}Co_{1/3}Mn_{1/3}O_2$ | / | 7 | 55.8 | 61.7 | 63.2 | 165.1 |
| 12 | $LiNi_{0.5}Co_{0.2}Mn_{0.3}O_2$ | / | 7 | 57.2 | 63.1 | 64.6 | 173. |
| 13 | $LiNi_{0.6}Co_{0.2}Mn_{0.2}O_2$ | / | 7 | 59.1 | 65 | 66.5 | 176.2 |
| 14 | $LiNi_{0.8}Co_{0.1}Mn_{0.1}O_2$ | / | 7 | 60.4 | 66.3 | 67.8 | 188 |
| 15 | $LiNi_{0.82}Co_{0.15}Al_{0.03}O_2$ | / | 7 | 62.1 | 66.9 | 68.5 | 178.5 |
| 16 | $LiNi_{0.5}Co_{0.2}Mn_{0.299}Ti_{0.001}O_2$ | / | 7 | 55.2 | 60.9 | 61.8 | 173.6 |
| 17 | $LiNi_{0.5}Co_{0.2}Mn_{0.298}Ti_{0.002}O_2$ | / | 7 | 53.2 | 57.8 | 60.9 | 174. |
| 18 | $LiNi_{0.5}Co_{0.2}Mn_{0.295}Ti_{0.005}O_2$ | / | 7 | 51.4 | 56.3 | 58.5 | 172.9 |
| 19 | $LiNi_{0.5}Co_{0.2}Mn_{0.29}Ti_{0.001}O_2$ | / | 7 | 48.9 | 52.4 | 56.1 | 171 |
| 20 | $LiNi_{0.5}Co_{0.2}Mn_{0.299}Mg_{0.001}O_2$ | / | 7 | 54.6 | 61.3 | 62.8 | 174.1 |
| 21 | $LiNi_{0.5}Co_{0.2}Mn_{0.299}Zr_{0.001}O_2$ | / | 7 | 54.9 | 60.3 | 60.8 | 174 |
| 22 | $LiNi_{0.5}Co_{0.2}Mn_{0.299}Y_{0.001}O_2$ | / | 7 | 54.1 | 59.5 | 60 | 174.5 |
| 23 | $LiNi_{0.5}Co_{0.2}Mn_{0.298}Ti_{0.001}Mg_{0.001}O_2$ | / | 7 | 54.6 | 60 | 60.5 | 174.3 |
| 24 | $LiNi_{0.82}Co_{0.15}Al_{0.029}Y_{0.001}O_2$ | / | 7 | 60.9 | 65.5 | 66.5 | 179.2 |

As can be seen from Table 1, according to Examples 1 to 5, by determining the coating amount of $CeZrO_4$ and changing the Dv50 of the positive electrode material, it is found that when the Dv50 of the positive electrode material coated with the coating material is 4 to 25 μm, the DCR at 25° C. for the battery is greatly lowered and the capacity of the initial discharge remains substantially unchanged. Because the smaller the particle size, the smaller the lithium ion diffusion path, the faster the lithium ion diffuses, and the smaller the DCR. However, due to limited technology, it is currently difficult to produce a positive electrode material having a Dv50 of less than 4 μm. In some examples of present application, Dv50 of the positive electrode material is 15 μm, because the positive electrode material with 15 μm particle size is easily prepared and the DCR is significantly reduced.

By comparing the results of Examples 1-5 with the results of Comparative Examples 1-5, it is understood that by using the positive electrode material coated with $CeZrO_{4-z}$, the DCR at 25° C. of the prepared lithium ion battery is significantly lowered while the initial discharge capacity remaining substantially unchanged, thereby improving the performance of the lithium ion battery. Because $CeZrO_{4-z}$ has non-stoichiometric characteristics and can act as a reservoir for oxygen, which makes oxygen atoms with high migration, so the positive electrode material has a high electron and ionic conductivity. In addition, the coating material is nano-$CeZrO_{4-z}$ with high structural stability and thermal stability, the coating layer formed of the coating material has a tetragonal phase structure, and the Ce atoms are in a gradient distribution. Further, Ce can form a stable surface structure of the positive electrode material, and Zr can suppress the C-axis variation in the delithiation process, so that the resulting positive electrode material structure is stable.

By comparing Comparative Examples 6 to 10 with Comparative Examples 1 to 5, when y of the substrate material $Li_{1+x}Co_{1-y}M_yO_2$ satisfies 0<y<0.1, that is, when y is not equal to 0, it can contribute to the improvement of DCR of the lithium ion battery, but the improvement effect is limited. Further, by comparing Examples 6 to 10 with Comparative Examples 6 to 10, in the case where the y of the substrate material $Li_{1+x}Co_{1-y}M_yO_2$ is not equal to 0, the lithium ion battery made of the positive electrode material coated with $CeZrO_{4-z}$ has a significantly reduced DCR while the initial discharge capacity of the battery remaining substantially unchanged as compared with the battery made of the positive electrode material without $CeZrO_{4-z}$. Because the coating of $CeZrO_{4-z}$ makes the positive electrode material has a high electron and ionic conductivity, thereby reducing DCR of the battery.

By comparing Example 3 with Examples 6 to 10, it is understood that the improvement effect of DCR is more remarkable when the y of the substrate material $Li_{1+x}Co_{1-y}M_yO_2$ is not equal to 0 with respect to the case where the substrate material is $LiCoO_2$.

According to Example 3 and Examples 11 to 13, by determining Dv50 of the positive electrode material and changing the coating amount of $CeZrO_{4-z}$, it is found that when the coating amount of $CeZrO_{4-z}$ accounts for 0.04-1% of the total mass of the positive electrode material, the DCR at 25° C. of the battery may be significantly reduced while the initial discharge capacity remaining substantially unchanged. Due to the higher content of $CeZrO_{4-z}$ leading to more improvement of the electronic conductance of lithium cobaltate, but when the content is too large (>1%), the proportion of active material capable of reversible deintercalation is correspondingly reduced, resulting in a decrease in the initial discharge capacity. When the content of the coating material is 0.1%, the electronic conductivity of the lithium cobaltate is improved while the content of the active material capable of reversible deintercalation being relatively large, thereby ensuring that the initial discharge capacity of the battery is high and the DCR is effectively reduced. Therefore, when the content of the coating material is 0.1%, the battery performance is optimal and the DCR is significantly lowered.

By comparing Examples 14 to 27 with Comparative Examples 11 to 24, in the case where the substrate material is a ternary material, the lithium ion battery made of the positive electrode material coated with $CeZrO_{4-z}$ has a significantly reduced DCR while the initial discharge capacity of the battery remaining substantially unchanged as compared with the battery made of the positive electrode material without $CeZrO_{4-z}$.

By comparing Examples 6 to 10 and Examples 14 to 17, it is understood that the DCR of the lithium ion battery is further lowered while increasing slightly the initial discharge capacity when the ternary material NCM is used as the substrate material with respect to using the substrate material $Li_{1+x}Co_{1-y}M_yO_2$ upon y being not equal to 0.

The FIGURE shows a XRD spectrum of Example 1. The characteristic peak of $CeZrO_{4-z}$ can be clearly seen from FIG. 1. It can be seen from Example 3 and Comparative Example 3 that by using the positive electrode material coated with $CeZrO_{4-z}$, DCRs at 25° C. upon 70% SOC, 20% SOC and 10% SOC of the lithium ion battery are reduced from 64.1, 73.8 and 78.8 to 58.2, 67.0 and 72.7 respectively, that is, they are reduced by almost 9 percentage points while the initial discharge capacity remaining substantially unchanged.

Those skilled in the art will appreciate that the above-described examples are merely exemplary examples, and various changes, substitutions and changes may be made without departing from the spirit and scope of the present application.

What is claimed is:

1. A positive electrode material, comprising:
a substrate material; and
a coating material formed on at least one portion of the surface of the substrate material;
the general formula of the substrate material being $Li_{1+x}Co_{1-y}M_yO_2$ or $LiNi_aCo_bN_{1-a-b}O_2$, wherein $0 \leq x < 0.1$, $0 \leq y < 0.1$ and M is at least one of selected from the group of Mn, Ni, Al, Mg, Ti, Zr, Y, P and Cr; $1/3 \leq a \leq 0.82$, $0.1 \leq b \leq 1/3$, $0.6 \leq a+b$, N is at least one of selected from the group of Mn, Al, Mg, Ti, Zr, La, Ce and Y;
the coating material includes $CeZrO_{4-z}$, wherein $0 \leq z < 0.1$.

2. The positive electrode material according to claim 1, wherein the coating material accounts for 0.04% to 1% of the total mass of the positive electrode material.

3. The positive electrode material according to claim 1, wherein the coating material accounts for 0.1% of the total mass of the positive electrode material.

4. The positive electrode material according to claim 1, wherein the substrate material formed with the coating material has the particle size, which corresponds to 50% of the volume distribution of the positive electrode material, of 4 to 25 μm.

5. The positive electrode material according to claim 1, wherein the substrate material formed with the coating material has the particle size, which corresponds to 50% of the volume distribution of the positive electrode material, of 15 μm.

6. The positive electrode material according to claim 1, wherein 0<y<0.1.

7. The positive electrode material according to claim 1, wherein a coating layer formed of the coating material has a tetragonal phase structure, and the Ce atoms are in a gradient distribution.

8. The positive electrode material according to claim 1, wherein both x and y are 0, the coating material accounts for 0.1% of the total mass of the positive electrode material, and the substrate material formed with the coating material has the particle size, which corresponds to 50% of the volume distribution of the positive electrode material, of 15 μm.

9. A positive electrode, comprising:
a positive current collector; and
a positive active material arranged on the positive current collector;
characterized in that the positive active material includes a positive electrode material;
wherein the positive electrode material comprises:
a substrate material; and
a coating material formed on at least one portion of the surface of the substrate material; the general formula of the substrate material being $Li_{1+x}Co_{1-y}M_yO_2$ or $LiNi_aCo_bN_{1-a-b}O_2$, wherein $0 \leq x < 0.1$, $0 \leq y < 0.1$ and M is at least one of selected from the group of Mn, Ni, Al, Mg, Ti, Zr, Y, P and Cr; $\frac{1}{3} \leq a \leq 0.82$, $0.1 \leq b \leq \frac{1}{3}$, $0.6 \leq a+b$, N is selected from at least one of Mn, Al, Mg, Ti, Zr, La, Ce and Y; the coating material includes $CeZrO_{4-z}$, wherein $0 \leq z < 0.1$.

10. The positive electrode according to claim 9, wherein the coating material accounts for 0.04% to 1% of the total mass of the positive electrode material.

11. The positive electrode according to claim 9, wherein the coating material accounts for 0.1% of the total mass of the positive electrode material.

12. The positive electrode according to claim 9, wherein the substrate material formed with the coating material has the particle size, which corresponds to 50% of the volume distribution of the positive electrode material, of 4 to 25 μm.

13. The positive electrode according to claim 9, wherein the substrate material formed with the coating material has the particle size, which corresponds to 50% of the volume distribution of the positive electrode material, of 15 μm.

14. The positive electrode according to claim 9, wherein 0<y<0.1.

15. The positive electrode according to claim 9, wherein a coating layer formed of the coating material has a tetragonal phase structure, and the Ce atoms are in a gradient distribution.

16. The positive electrode according to claim 9, wherein both x and y are 0, the coating material accounts for 0.1% of the total mass of the positive electrode material, and the substrate material formed with the coating material has the particle size, which corresponds to 50% of the volume distribution of the positive electrode material, of 15 μm.

17. A lithium ion battery, characterized by comprising the positive electrode according to claim 9.

* * * * *